United States Patent [19]
Finch et al.

[11] Patent Number: 5,172,744
[45] Date of Patent: Dec. 22, 1992

[54] ROLL-UP DOOR SYSTEM

[76] Inventors: Harry E. Finch, 5273 Vista del Sol, Cypress, Calif. 90630; Geza J. Szayer, 24771 Acropolis Dr., Mission Viejo, Calif. 92691

[21] Appl. No.: 424,944

[22] Filed: Oct. 23, 1989

[51] Int. Cl.⁵ .............................................. E06B 9/08
[52] U.S. Cl. .................................. 160/133; 160/201; 160/318
[58] Field of Search ............... 160/201, 133, 242, 316, 160/317, 318, 271, 235, 313

[56] References Cited

U.S. PATENT DOCUMENTS

| | | | |
|---|---|---|---|
| 2,270,978 | 1/1942 | Swormstedt | 160/271 X |
| 2,696,250 | 12/1954 | Michelman | 160/317 X |
| 3,234,161 | 5/1973 | Pierce | 160/133 |
| 3,732,913 | 5/1973 | Wrono | 160/133 |
| 3,842,892 | 10/1974 | Stieler | 160/133 |
| 3,970,134 | 7/1976 | Sinnock et al. | 160/133 |
| 4,080,757 | 3/1978 | Westerman | 292/DIG. 36 |
| 4,347,886 | 9/1982 | von Knorring | 160/242 |
| 4,930,563 | 6/1990 | Finch et al. | 160/133 X |

FOREIGN PATENT DOCUMENTS

| | | | |
|---|---|---|---|
| 250577 | 1/1964 | Australia | 160/318 |
| 744567 | 10/1960 | Canada | 160/271 |

*Primary Examiner*—Blair M. Johnson
*Attorney, Agent, or Firm*—Henry M. Bissell

[57] ABSTRACT

A roll-up or curtain type door is disclosed which is for use in large doorways, the door having an improved support apparatus, an improved spring mounting mechanism, and a unique bearing block which also functions to support the door as it is rolled up. The roll-up door has a substantially stronger hollow hexagonal barrel assembly which is less susceptible to flexural stress, and a spring mounting arrangement which allows the springs to shrink or grow longitudinally as the door is rolled up or down. The barrel assembly is mounted on pivoting support means allowing the barrel assembly to move away from and toward the guide tracks as the door is rolled up and down, whereby the variation in diameter of the barrel assembly does not affect the performance of the door. Interlocking bearing blocks are mounted on the outside side edges of the roll-up door to provide support as the door is rolled onto the barrel assembly and also to provide an edge seal to prevent air from flowing around the edges of the door when it is in its lowered position. A novel seam configuration for releasably joining adjacent panels of the roll-up door is also disclosed.

37 Claims, 7 Drawing Sheets

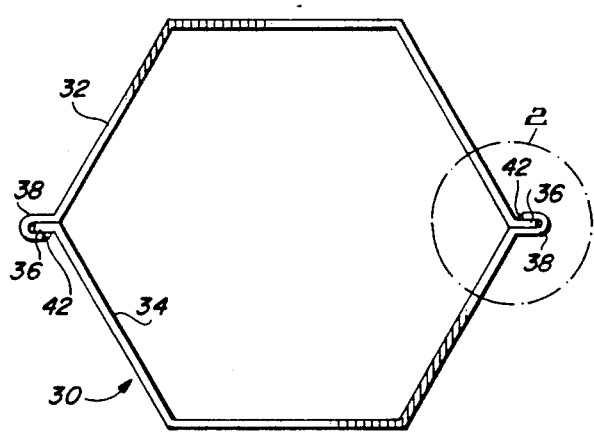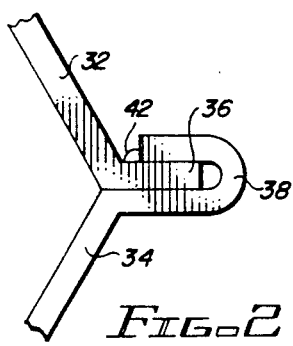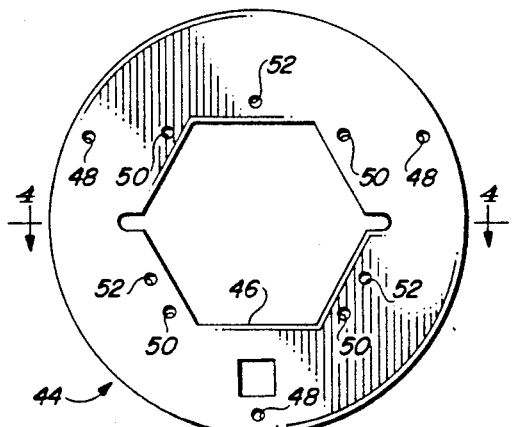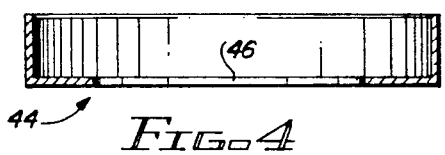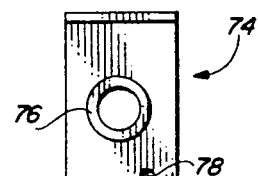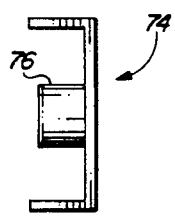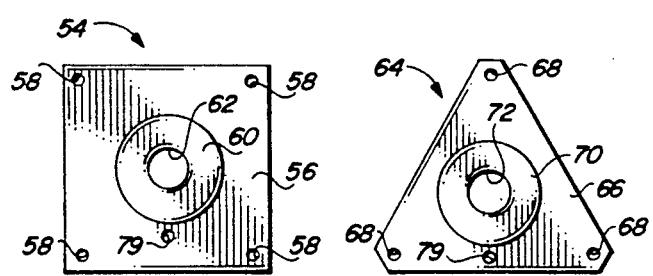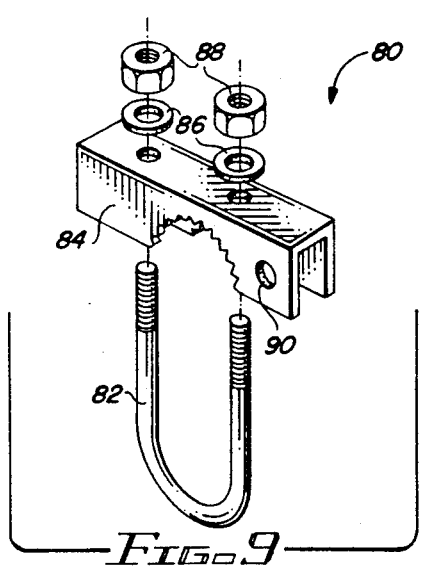

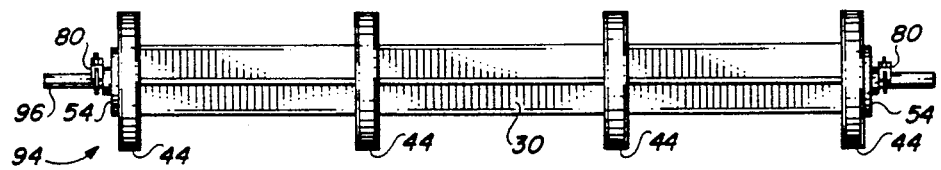
FIG_10
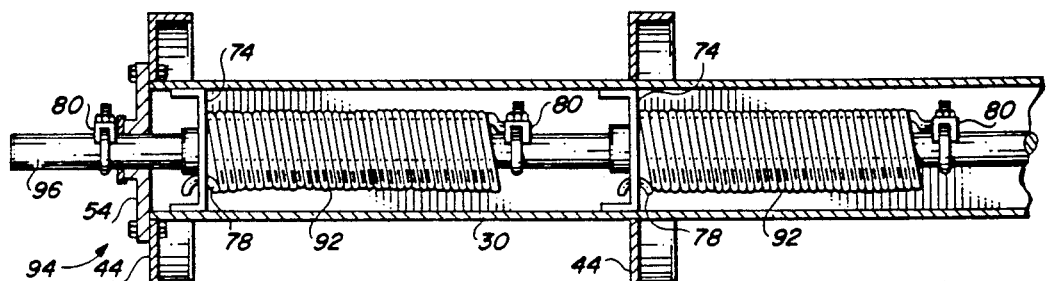
FIG_11
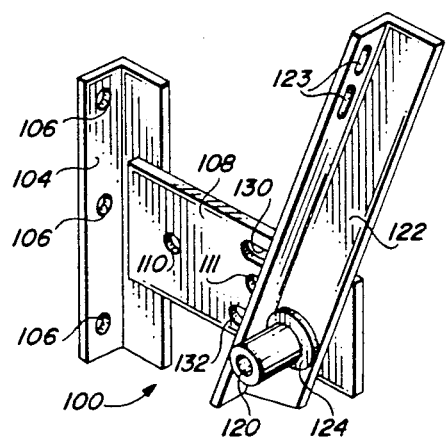
FIG_12
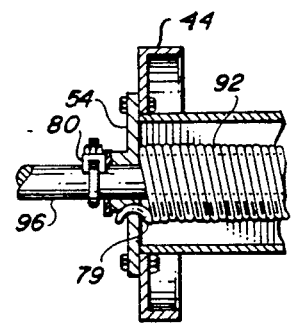
FIG_11A
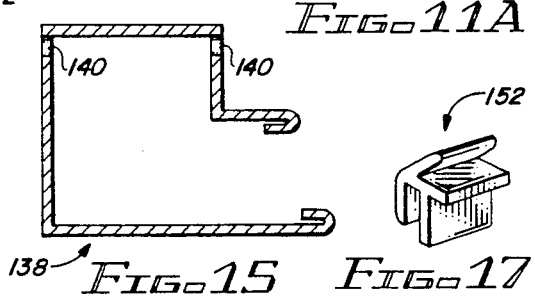
FIG_15    FIG_17
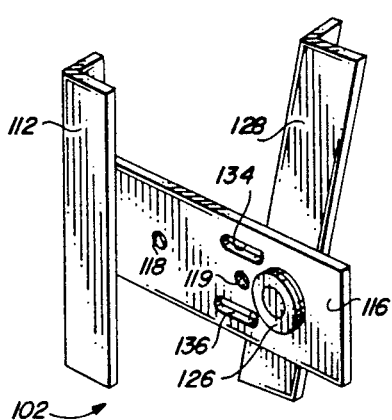
FIG_13
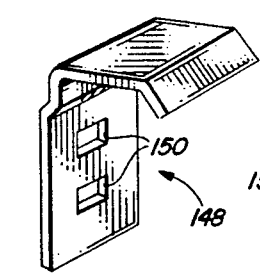
FIG_16
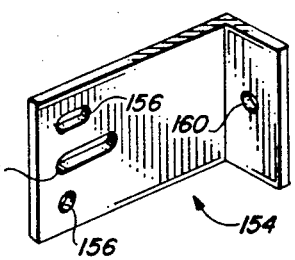
FIG_18

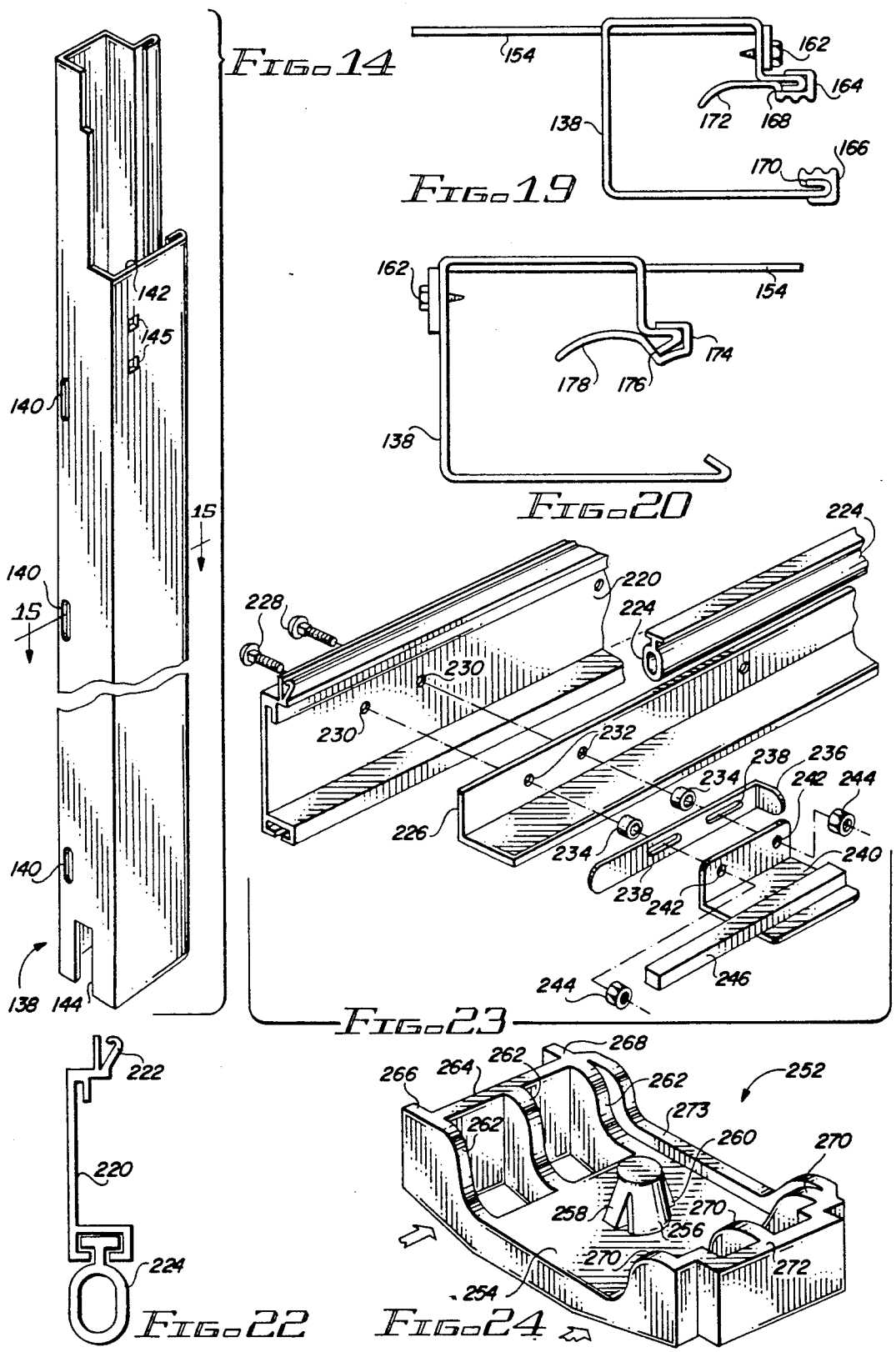

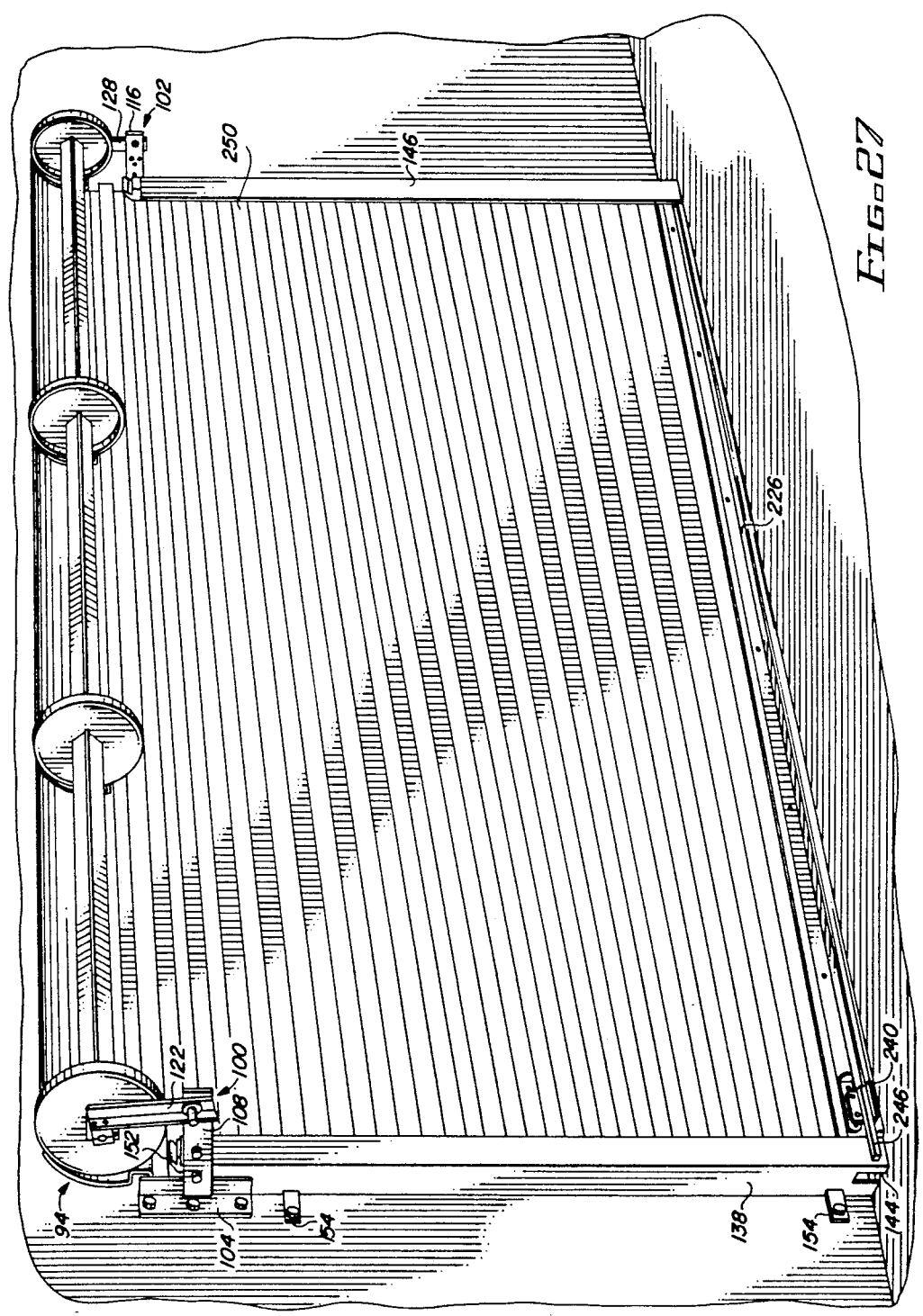

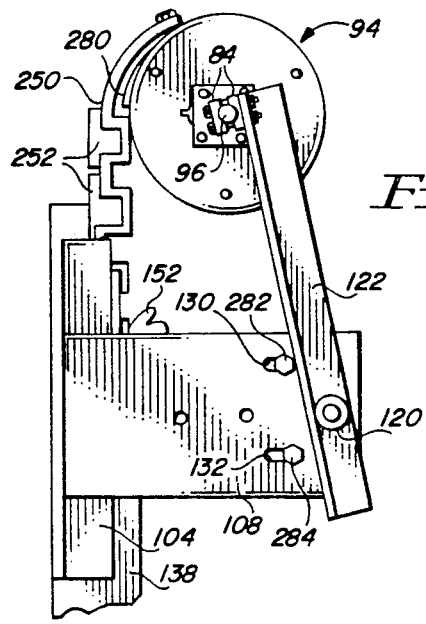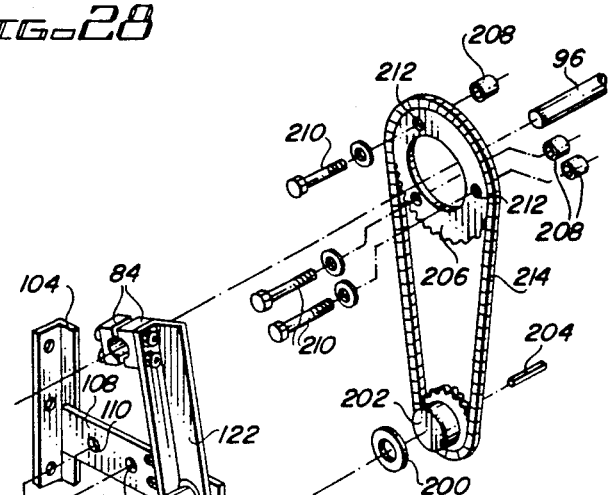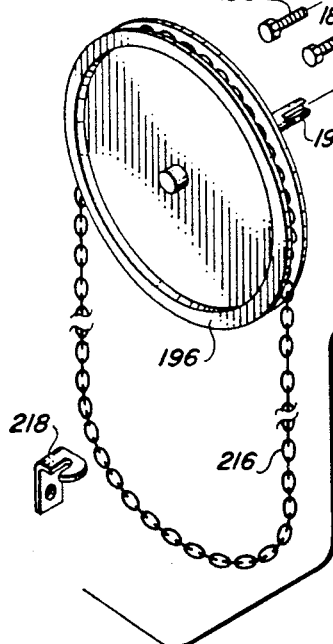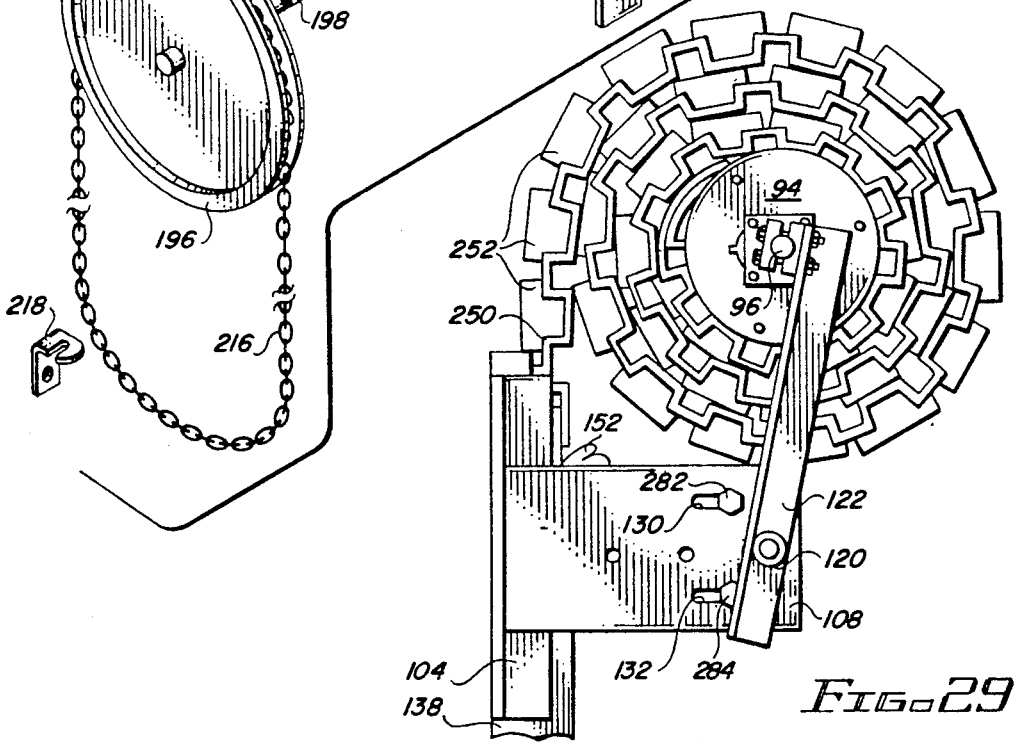

ROLL-UP DOOR SYSTEM

BACKGROUND OF THE INVENTION

1. Field of the Invention

The present invention relates generally to a roll-up or curtain type door, and more particularly to an improved roll-up door for use in large doorways, the door of the present invention having an improved support apparatus, an improved spring mounting mechanism, and a unique bearing block which also functions to support the door as it is rolled up.

2. Description of the Related Art

Buildings ranging in size from mini-warehouses or mini-storage facilities to huge warehouses with entrances sufficiently large to admit large trucks require a secure, lockable door which may be easily opened, and which does not require an inordinate amount of space either for the door itself or for the room required to open and close it. Conventional doors for the most part are not useable in such applications since they are either too small or too unwieldy to be acceptable. Roll-up or curtain doors represent a convenient way to provide an easily operable security closure, and they are able to do so in a fairly limited space.

Roll-up doors are typically constructed using one or more sheets of relatively thin metal which are formed by stamping or rolling to provide a plurality of horizontal corrugations extending the entire width of the door. This construction allows the door to be rolled up as it is raised for opening, thereby allowing the door to be stored in a cylindrical configuration at the top of the door opening. Vertical guide tracks, which may be made of extruded aluminum or formed galvanized steel, are typically mounted at opposite sides of the door opening and serve to guide the door as it moves up and down.

The top of the formed metal sheet is fastened to a barrel assembly which is typically constructed with a heavy wall, steel torque tube axle which supports thereon two or more galvanized steel drums or wheels. The barrel assembly is rotatably mounted between two brackets located slightly above the upper corners of the door opening. The barrel assembly is biased by one or two tempered steel torsion springs to balance the weight of the roll-up door, thereby allowing the door to be easily raised or lowered in a simple one-hand operation. Adhesively affixed tapes typically extend along the inner face of the door where contact is made with the galvanized steel drums or wheels to protect the door against wear by the galvanized steel drums or wheels, and to avoid rubbing of the successive layers of the roll-up door against each other.

Such doors also typically have a locking mechanism mounted thereon, which may be a simple sliding bolt type lock. With this mechanism, when the door is closed the bolt slides into a locking engagement with the guide track or with other metal means which prevents the door from being opened unless the bolt is opened. A simple padlock may then be used to lock the bolt assembly.

This type of roll-up door is easy to operate, and will provide years of dependable service with virtually no maintenance. Such doors are relatively inexpensive and relatively easy to manufacture, although the business of constructing such doors is a highly competitive one. Accordingly it is desirable to provide a high degree of quality and reliability while minimizing the cost of manufacturing the doors. Minimizing the quantity of hardware components is always desirable, both from a cost standpoint and from a desire to minimize the number of parts and by so doing the amount of assembly required.

While such roll-up doors are relatively easy to construct for smaller door openings, there are several particular problems which are encountered when designing such a door for a large door opening such as a warehouse door through which large trucks and trailers will pass. Such warehouses commonly have doorways which are twenty feet tall, and correspondingly wide. It will at once be appreciated by those skilled in the art that there are two problems directly attributable to the size of the door.

First, the weight of the formed metal curtain door is supported by the barrel assembly at the two ends thereof, creating a flexural stress in the torque tube of the barrel assembly. Particularly when the formed metal curtain door is rolled up and the load is the heaviest, the torque tube will flex, causing a bowing of the door which requires the metal of the formed metal curtain door to flex as well. This is undesirable, as is the possibility of a fracture of the torque tube supporting the door. In the event of such a fracture, the heavy door and barrel assembly would come down with likely serious consequences.

In addition, with tall doors another problem is inherent in the design. The diameter of the barrel assembly will vary considerably between a minimum when the door is fully down, and a maximum when the door is up and the long formed metal curtain door is wound around the barrel assembly. This creates considerable problems in the mounting of the barrel assembly, since it must be mounted sufficiently far from the interior wall to allow the formed metal curtain door to roll up on the barrel assembly. When the formed metal curtain door is fully down, considerable space will exist between the barrel assembly and the guide tracks, an undesirable situation due to the gap which must be left between the door header and the door.

Another fundamental problem inherent in the design of large roll-up doors is the high risk of spring failure. In such doors, one or more springs are each mounted to an axle extending through the torque tube at one end, and to the torque tube or drums of the barrel assembly at the other end. Thus, both ends of the springs are fixedly mounted, leaving no room for longitudinal shrinkage or expansion. This greatly increases the likelihood of spring breakage, particularly at the ends thereof where the springs are retained. When spring breakage does occur, typically the entire barrel assembly must be shipped to the factory for spring replacement since the springs are located inside the torque tube.

An additional problem with large roll-up doors is the fact that the adhesively affixed tapes extending along the inner face of the door where contact is made with the galvanized steel drums or wheels are simply not sufficient in view of the weight of the formed metal curtain door when it is rolled up. The corrugations of the formed metal curtain door thus tend to nest and/or crush each other as the door is rolled up or down. In order to achieve the objectives of durability and long life, it is apparent that another arrangement is necessary.

Such large doors also exhibit poorer sealing than smaller doors, allowing air to flow more or less freely around the edges of the door. As such, the sealing characteristics of such large roll-up doors have been rather poor, an undesirable weak point not acceptable to most warehouses.

It is accordingly a first primary objective of the present invention that it provide a substantially stronger barrel assembly design. The improved design must be substantially less susceptible to flexural stress than are presently known doors. In addition, the improved barrel assembly design should be designed in a manner which increases the strength thereof without greatly increasing the weight of the barrel assembly, since the barrel assembly must be supported at the top of the door assembly.

It is a second primary objective of the present invention that it mount the barrel assembly in a manner whereby the variation in diameter of the barrel assembly does not affect the performance of the door. In achieving this objective, it is desirable to mount the barrel assembly no further from the interior surface of the wall than is absolutely necessary.

It is a third primary objective of the present invention to mount the springs used in the barrel assembly in a manner allowing for longitudinal expansion and shrinkage. By so doing, the likelihood of catastrophic breakage of the springs is greatly reduced. It is a correlated objective to make the barrel assembly serviceable by the user in the event of spring breakage, thus obviating the need to send the barrel assembly to the factory for repair.

It is a fourth primary objective of the present invention to provide a mechanism for supporting the formed metal curtain door as it is rolled onto the barrel assembly. This mechanism must protect the formed metal curtain door against damage caused by nesting of the corrugations and the weight of the formed metal curtain door.

In accordance with an additional objective, it is desirable to provide a sealing mechanism to prevent air from flowing around the edges of the door when it is in its lowered position. In a further additional objective, the clips which support the guide tracks should be reversible. It is also an objective to make the resulting roll-up door as durable and long-lasting as is possible, while simultaneously making it economic of construction to afford it the greatest possible economic advantage over competing doors. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, a large roll-up door is devised which has a modular barrel assembly which is substantially stronger than preexisting barrel assemblies. In addition, the roll-up door of the present invention is mounted on a pivoting assembly at each end to keep the barrel assembly close to the interior wall on which the door is located.

The spring assemblies are fixedly attached longitudinally at one end only, thereby allowing room for the springs to expand or shrink In addition, the mounting design of the springs enables the barrel assembly to be easily disassembled, without requiring factory replacement of the springs A series of interlocking bearing blocks are used on each side of the formed metal curtain door to prevent the corrugations in the door from being crushed when the door is rolled up. The bearing blocks work with a flexible finger located on the guide tracks to keep air from passing through the door. Finally, the clips holding the guide tracks in place against the interior wall are reversible to mount on either side of the guide tracks.

The design of the barrel assembly is radically different from previously known barrel assemblies. Rather than using a cylindrical torque tube as the sole load-supporting member, the barrel assembly of the present invention uses a hexagonal tube rotatably mounted on the axle to support a plurality of drums mounted along the length of the hexagonal tube. This configuration better resists the flexural stresses than does an axle by itself A plurality of springs are located inside the hexagonal tube, with one end of each spring being mounted onto the axle. The other end of each spring is mounted onto a rectangular spring plate, which fits into the interior of the hexagonal tube. The spring plate is free to move longitudinally within the hexagonal tube, but may not move angularly with respect to the hexagonal tube. Thus, the springs are free to grow longitudinally as they wind and unwind. This design has the additional advantage that it is entirely user-serviceable.

The barrel assembly is supported by two door support brackets mounted at the top of the two guide tracks. The door support brackets differ from fixed position supports for the barrel assembly in that they afford a degree of movement of the barrel assembly toward and away from the interior wall in which the roll-up door is mounted. When the door is fully lowered, the barrel assembly will be supported in its closest position to the interior wall. As the door is rolled up, the barrel assembly will move further away from the interior wall to allow the greater diameter rolled-up door to fit on the barrel assembly without binding on the interior wall.

Mounted on the outside of the formed metal curtain door on both edges thereof are a plurality of bearing blocks which support successive layers of the formed metal curtain door as it is rolled up on the barrel assembly. The bearing blocks interlock with each other to provide an interlocking fit when the door is in its lowered position, presenting an essentially flat continuous surface facing the exterior. By using a flexible finger mounted on a plastic seal on each of the guide tracks, which flexible fingers fit against the continuous groups of bearing blocks on each side of the door, air is essentially prevented from flowing through the roll-up door of the present invention.

It may therefore be seen that the present invention teaches in a first primary aspect a roll-up door having a substantially stronger barrel assembly design than previously known roll-up doors. The improved design is substantially less susceptible to flexural stress than are such presently known doors. In addition, the improved barrel assembly is designed in a manner which increases the strength thereof without greatly increasing the weight of the barrel assembly.

In a second primary aspect of the present invention, the barrel assembly is mounted in a manner whereby the variation in diameter of the barrel assembly does not affect the performance of the door. In achieving this objective, the barrel assembly is mounted no further from the interior surface of the wall than is absolutely necessary.

In a third primary aspect of the present invention, the springs used in the barrel assembly are mounted in a manner allowing for considerable longitudinal expansion and shrinkage. By so doing, the likelihood that catastrophic breakage of the spring will occur is greatly reduced. In a correlated aspect, the barrel assembly is designed to be serviceable by the user in the event of spring breakage, thus obviating the need to send the barrel assembly to the factory for repair if a spring breaks.

In a fourth primary aspect of the present invention, a mechanism is provided for supporting the formed metal curtain door as it is rolled onto the barrel assembly. This mechanism protects the formed metal curtain door against damage caused by nesting of the corrugations and the weight of the formed metal curtain door.

In an additional aspect, a sealing mechanism is provided to prevent air from flowing around the edges of the door when it is in its lowered position. In a further additional aspect, the clips which support the guide tracks are reversible. The roll-up door of the present invention is as durable and long-lasting as is possible, while being economic of construction to afford it the greatest possible economic advantage over competing doors.

A further feature of the invention relates to a novel arrangement for joining adjacent panels in the roll-up door in a manner which permits removal and replacement of a damaged panel in the field. The horizontal edges of the door panels are formed with a particular structural configuration, different at each edge, which enables the panels to be joined either by rotating them together or sliding them together sideways. The panels can be disassembled in reverse fashion. When assembled to form a door, the panels are permitted to flex in their rolled up direction in the same manner as is now provided with conventionally seamed doors. A novel method is also provided for replacing one of these door panels in the field.

BRIEF DESCRIPTION OF THE DRAWINGS

A better understanding of the present invention may be realized from a consideration of the following detailed description, taken in conjunction with the accompanying drawings, in which:

FIG. 1 is an end view of the hexagonal tube used to form the barrel assembly portion of the present invention, illustrating the assembly of the hexagonal tube from two interlocking segments;

FIG. 2 is an enlarged view of the interlocking edges of the two interlocking segments used to form the hexagonal tube;

FIG. 3 is an end view of one of the drums which are mounted on the hexagonal tube of FIG. 1 to form the barrel assembly;

FIG. 4 is a cutaway view of the drum shown in FIG. 3;

FIG. 5 is an end view of a square bearing plate for mounting onto a drum at each end of the hexagonal tube;

FIG. 6 is an end view of an alternate triangular bearing plate for mounting onto a drum at each end of the hexagonal tube, which may be used instead of the square bearing plate of FIG. 5;

FIG. 7 is an end view of a spring plate to which is attached one end of a spring, the spring plate fitting inside of the hexagonal tube in a manner allowing longitudinal movement inside the hexagonal tube;

FIG. 8 is a side view of the spring plate shown in FIG. 7;

FIG. 9 is a perspective view of a clamp used in the barrel assembly for several purposes, including to hold the other end of a spring to an axle, and to secure lengthwise the rotating portion of the barrel assembly on the axle;

FIG. 10 is a plan view of an exemplary barrel assembly of the present invention, showing four drums mounted on the hexagonal tube, which in turn is rotatably mounted on the axle;

FIG. 11 is a cutaway view of half of the barrel assembly of FIG. 10 showing a pair of springs contained therein, one end of each spring being, attached to a spring plate, the other end of each spring being attached to the axle;

FIG. 11A is a partial view of the barrel assembly of FIG. 10 showing an alternative way of anchoring a spring;

FIG. 12 is a perspective view of one of the left door support brackets, showing it from the side away from the door;

FIG. 13 is a perspective view of the other of the right door support brackets, showing it from the side toward the door;

FIG. 14 is a perspective view of the left guide track for supporting the formed metal curtain door, showing the slots in which the reversible clips used for mounting are to be located;

FIG. 15 is a cutaway view of the left track guide showing the slots in which one of the reversible clips used for mounting is to be located;

FIG. 16 is a perspective view of the head stop which is located at the top of the track guides to stop further upward movement of the formed metal curtain door when its bottom is at the top of the track guides;

FIG. 17 is a perspective view of the plastic glide used at the tops of the track guides to guide the formed metal curtain door into the track guides;

FIG. 18 is a perspective view of a reversible mounting clip for installation in the slots in the track guides to hold the track guides in position on the interior of the wall on which the door is located;

FIG. 19 is a top view of the left track guide of FIG. 14, showing the installation of a reversible mounting clip of FIG. 18, and also showing the installation of plastic track guide members onto the edges of the left track guide, one of the plastic track guide members having a flexible finger seal to prevent air from passing through the door;

FIG. 20 is a top view of the left track guide of FIG. 14, showing the installation of a reversible mounting clip of FIG. 18 in a manner opposite to that shown in FIG. 19, and also showing the installation of an alternate plastic track guide member having a flexible finger seal onto one of the edges of the left track guide;

FIG. 21 is an exploded perspective view of a chain drive assembly for raising and lowering the formed metal curtain door of the present invention;

FIG. 22 is a side view of a reinforcing beam used at the bottom of the formed metal curtain door and a sealing strip mounted at the bottom of the reinforcing beam;

FIG. 23 is an exploded perspective view of the reinforcing beam, the sealing strip, a segment of angle iron, a latch, and a step plate with a head stop bar mounted thereon;

FIG. 24 is a perspective view of one of the bearing blocks used both to cushion one layer of the formed metal curtain door upon another, and, in conjunction with the flexible finger seal, to prevent air from passing through the door;

FIG. 27 is a perspective view of the roll-up door of the present invention with the chain drive of FIG. 21 removed for clarity, with the formed metal curtain door in its fully downward position;

FIG. 28 is a side view of the top portion of the roll-up door of FIG. 27, showing the position of the door support bracket with the formed metal curtain door in its fully downward position;

FIG. 29 is a side view of the top portion of the roll-up door of FIG. 27, showing the position of the door support bracket with the formed metal curtain door in its fully raised position;

DETAILED DESCRIPTION OF THE PREFERRED EMBODIMENT

Figure 25:
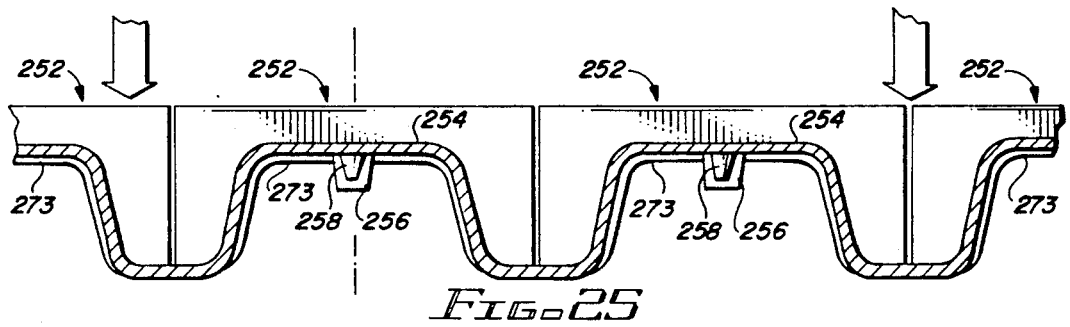
FIG. 25 is an edge view of a portion of the formed metal curtain door with a number of the bearing blocks of FIG. 24 mounted thereon looking in the direction of its arrows in FIG. 24.

The preferred embodiment of the present invention has five basic portions, which will be discussed as separate segments of the roll-up door of the present invention. These segments are the barrel assembly, the door support brackets, the guide tracks, the roll-up door itself, and the drive mechanism for raising and lowering the roll-up door. The first of these segments to be discussed will be the barrel assembly.

Referring first to FIG. 1, a hexagonal tube 30 is illustrated which is made of two identical tube halves 32 and 34. The tube half 32 will be described, it being noted that the construction of the tube half 34 is identical. The tube half 32 has three long, rectangular surfaces, with the longer sides of the three surfaces being connected together at the edges. The angles between adjacent sides is 120 degrees, as is the case with a hexagon. One long free edge of the tube half 32 has a flange 36 extending therefrom, and the other long free edge of the tube half 32 has a U-shaped segment 38 extending therefrom. The flange 36 is oriented directly away from the U-shaped segment 38, and the interior of the U-shaped segment 38 is oriented toward the flange 36.

The tube halves 32 and 34 are brought together to form the hexagonal tube 30, with the flange 36 of the tube half 32 disposed in the U-shaped segment 38 of the tube half 34, and the flange 36 of the tube half 34 disposed in the U-shaped segment 38 of the tube half 32. Note that the free top edge of the U-shaped segment 38 on the tube half 34 is disposed slightly away from the surface of the tube half 32, and that the free top edge of the U-shaped segment 38 on the tube half 32 is disposed slightly away from the surface of the tube half 34. This is because the free legs of the U-shaped segments 38 are shorter than are the attached legs of the U-shaped segment 38.

It should be noted that in the preferred embodiment, the tube half 32, the tube half 34, and other parts such as are shown in FIGS. 3-6 are all made of stamped galvanized steel material. In addition, the tube half 32 and the tube half 34 may be welded together by skip welding at 42.

Referring next to FIGS. 3 and 4, a drum 44 for mounting at various locations along the length of the hexagonal tube 30 is illustrated. The drum 44 is also made of stamped galvanized steel material, and has a hexagonal aperture 46 therethrough configured to fit exactly over the hexagonal shape of the hexagonal tube 30. The hexagonal aperture 46 also has openings for admitting the U-shaped segments 38 on the hexagonal tube 30. The outer surface of the drum 44 is cylindrical, as best shown in FIG. 4.

The drum 44 has three apertures 48 evenly angularly distributed near the outer diameter of the drum 44, as best shown in FIG. 3. In addition four apertures 50 are distributed around the hexagonal aperture 46 in a square pattern, and three apertures 52 are distributed around the hexagonal aperture 46 in a triangular pattern. In the example used herein, the roll-up door uses four drums 44.

Referring next to FIG. 5, a square bearing plate 54 is illustrated which has a square mounting plate 56 with four apertures 58 in a pattern identical to the pattern of the apertures 50 on the drum 44 of FIG. 3. The square bearing plate 54 has a bearing 60 therein, which bearing 60 has an aperture 62 to admit an axle (not shown in FIG. 5) therein. The axle will thus turn freely in the bearing 60.

Referring next to FIG. 6, an alternative triangular bearing plate 64 is illustrated which has a triangular mounting plate 66 with three apertures 68 in a pattern identical to the pattern of the apertures 52 on the drum 44 of FIG. 3. The triangular bearing plate 64 has a bearing 70 therein, which bearing 70 has an aperture 72 to admit an axle (not shown in FIG. 6) therein. The axle will thus turn freely in the bearing 70. Either the square bearing plate 54 or the triangular bearing plate 64 could be used in the roll-up door of the present invention.

Referring next to FIGS. 7 and 8, a spring plate 74 is illustrated which is sized to fit within the hexagonal tube 30 (FIG. 1). The spring plate 74 is U-shaped, with the base of the U being wide, as shown in FIG. 8. The height of the spring plate 74 (the width of the U) is just less than the inner height of the hexagonal tube 30 (the distance between opposing rectangular surfaces), and the width of the spring plate 74 (the thickness of the U) is approximately the same as the width of one of the rectangular surfaces of the hexagonal tube 30. Thus, the spring plate 74 will fit within the hexagonal tube 30 and will be able to slide longitudinally within the hexagonal tube 30, but will not be able to move angularly with respect to the axis of the hexagonal tube 30.

Centrally located on the spring plate 74 is a hollow cylindrical segment 76. When the spring plate 74 is installed in the hexagonal tube 30, the cylindrical segment 76 will admit an axially located axle (not shown) therethrough. Also located on the cylindrical segment 76 is an aperture 78, which is located on the base of the U as shown in FIG. 7. The aperture 78 is for use in attaching one end of a spring (not shown) to the spring plate 74, and is located a distance from the axis of the cylindrical segment 76 equal to the radius of the spring (not shown). A similar aperture 79 is shown in the bearing plates 54 and 64 of FIGS. 5 and 6 for the same purpose.

Referring next to FIG. 9, a clamp 80 is illustrated, one part of which is a U-shaped bolt segment 82 which is threaded on both ends. A saddle clamp 84 is placed over the two ends of the U-shaped bolt segment 82, and attached with washers 86 and nuts 88. An article located between the saddle clamp 84 and the U-shaped bolt segment 82 will be retained in the clamp 80 as the nuts 88 are tightened. The clamp 80 described to this point is similar to a standard clamp, such as a muffler clamp. However, there is an aperture 90 in the side of the saddle clamp 84, which aperture 90 may be used in attaching the other end of a spring to the clamp 80 (FIG. 11).

Referring next to FIGS. 10 and 11, the assembly of the above components and a plurality of springs 92 into a barrel assembly 94 is illustrated. The springs 92 used in the barrel assembly 94 are tempered steel torsion springs, and have at their ends provisions for securing the ends with bolts. The barrel assembly 94 used as an example herein uses four drums 44 and four springs 92, although more or fewer could be used, from a single spring to as many as are needed, depending on the size of the door being constructed.

The four drums 44 are located on the hexagonal tube 30 at even intervals, with a drum 44 being located at each end of the hexagonal tube 30 with the flat side facing outward on the hexagonal tube 30. The four drums 44 are welded onto the hexagonal tube 30, typically by spot welding.

It will be appreciated that there are four sets each including a spring 92, a spring plate 74 and a clamp 80, with each of the sets being assembled in the same manner. A spring plate 74 is attached to one end of a spring 92 using a nut, and a saddle clamp 84 is attached to the other end of the spring 92 using a nut. The clamp 80 is assembled loosely, and the assembly is ready for installation in the hexagonal tube 30.

An axle 96 is inserted consecutively through the spring plate 74, the spring 92, and the U-shaped bolt segment 82 of the clamp 80. Three additional spring assemblies are installed on the axle 96 in the same manner, and then the axle 96 together with the four spring assemblies is placed in the hexagonal tube 30. The spring plates 74 will need to be turned to fit properly.

With the axle 96 extending out of both ends of the hexagonal tube 30, two square bearing plates 54 are placed over the ends of the axle 96. (Note that two triangular bearing plates 64 could be used instead of the square bearing plates 54.) The bearing plates 54 are then attached to adjacent drums 44 with four bolts and nuts each.

With the axle 96 extending from both ends of the barrel assembly 94 an equal amount, two clamps 80 are used to retain the hexagonal tube 30 in position intermediate the ends of the axle 96. It will thus be realized that the hexagonal tube 30, the drums 44, the spring plates 74, and the square bearing plates 54 will rotate around the axle 96. As these rotatable components are rotated in one direction (the direction corresponding to the roll-up door being lowered), the springs 92 will be tightened. As these rotatable components are rotated in the other direction (the direction corresponding to the roll-up door being raised), the springs 92 will be loosened.

It will also be appreciated by those skilled in the art that as the springs 92 tighten or loosen, they will be free to lengthen or shorten longitudinally as the spring plates 74 slide longitudinally within the hexagonal tube 30. This will prevent the springs 92 from binding and breaking easily. In addition, it will be seen that the barrel assembly 94 is easy to assemble or disassemble, making replacement of broken springs easily accomplished.

Each of the springs in FIG. 11 is shown fastened to the axle at one end by a locking clamp 80 while the other end is anchored to a spring plate 74 through the aperture 78 in the spring plate. FIG. 11A illustrates an alternative arrangement which may be used to anchor the outboard ends of the springs 92 which are adjacent the bearing plates 54. In FIG. 11A, while the inboard end of the depicted spring 92 will be secured to the axle 96 by a clamp 80, as indicated in FIG. 11, the outer end of the spring 92 is engaged through the aperture 79 in the bearing plate 54. This arrangement eliminates the need for two of the spring plates 74 which are required for the embodiment of FIG. 11.

Referring next to FIGS. 12 and 13, a left door support bracket 100 and a right door support bracket 102 are illustrated. It should be noted that left and right are with respect to the perspective from inside the building in which the roll-up door is installed, gazing toward the door (and toward the outside of the building through the door). The left door support bracket 100 and the right door support bracket 102 are exactly alike, except that they are mirror images of each other.

The left door support bracket 100 has provision for mounting consisting of a segment of angle iron 104 with three apertures 106 therein. The apertures 106 will be used to mount the left door support bracket 100 to the interior wall of the building (not shown) to support the left side of the barrel assembly 94. Welded to and projecting orthogonally from the segment of angle iron 104 is a support plate 108. The support plate 108 has two apertures 110 and 111 therein, which apertures 110 and 111 may be used to support the mechanism for raising and lowering the roll-up door (not shown), if it is mounted on the left door support bracket 100.

Similarly, the right door support bracket 102 has provision for mounting consisting of a segment of angle iron 112 with three apertures 114 (not shown) therein. The apertures 114 will be used to mount the right door support bracket 102 to the interior wall of the building (not shown) to support the right side of the barrel assembly 94. Welded to and projecting orthogonally from the segment of angle iron 112 is a support plate 116. The support plate 116 has two apertures 118 and 119 therein, which apertures 118 and 119 may be used to support the mechanism for raising and lowering the roll-up door (not shown), if it is mounted on the right door support bracket 102.

Projecting from the support plate 108 on the left door support bracket 100 is a left pivot tube 120, which is welded to the support plate 108. A left pivot arm 122 is movably mounted on the left pivot tube 120 using a bushing (not shown) mounted between two washers 124. The left pivot arm 122 extends upwards from the support plate 108, and can move rotatably on the left pivot tube 120. The left pivot arm 122 has two slots 123 located near the top thereof for use in mounting the barrel assembly 94 on the left side thereof.

Similarly, projecting from the support plate 116 on the right door support bracket 102 is a right pivot tube 126, which is welded to the support plate 116. A right pivot arm 128 is movably mounted on the right pivot tube 126 using a bushing (not shown) mounted between two washers (not shown). The right pivot arm 128 extends upwards from the support plate 116, and can move rotatably on the right pivot tube 126. The right pivot arm 128 also has two slots (not shown) located near the top thereof for use in mounting the barrel assembly 94 on the right side thereof.

Located in the support plate 108 are two horizontally extending slots 130 and 132. The slots 130 and 132 are located between the left pivot arm 122 (when it is vertical) and the segment of angle iron 104. The slot 130 is located near the top of the support plate 108, and the slot 132 is located near the bottom of the support plate 108. The slots 130 and 132 will be used in conjunction with hardware mounted therein to limit the rotational movement of the left pivot arm 122 in both directions.

Located in the support plate 116 are two horizontally extending slots 134 and 136. The slots 134 and 136 are located between the right pivot arm 128 (when it is vertical) and the segment of angle iron 112. The slot 134 is located near the top of the support plate 116, and the slot 136 is located near the bottom of the support plate 116. The slots 134 and 136 will be used in conjunction with hardware mounted therein to limit the rotational movement of the right pivot arm 128 in both directions.

Referring next to FIGS. 14 and 15, a left guide track 138 is illustrated which is formed of galvanized steel sheet stock bent as shown. The left guide track 138 has a plurality of pairs of opposed slots 140 formed therein (one such pair is shown in FIG. 15) for receiving mounting hardware (not shown in FIGS. 14 and 15) to mount the left guide track 138 to the interior wall of a building (not shown) adjacent the left side of an opening therein. The mounting hardware will thus extend through the left guide track 138. The slots 140 are stamped into the left guide track 138 at the time it is manufactured.

The left guide track 138 has both longitudinal edges bent inwardly, with the area between the two longitudinal edges defining the area into which the roll-up door will fit. The side of the left guide track 138 which will face the wall on which the left guide track 138 is mounted is higher than is the other side. The top edge 142 on the lower side of the left guide track 138 is approximately nine inches lower than the edge facing the wall on which the left guide track 138 is mounted in order to provide for the entry of the roll-up door into the guide tracks.

Below the edge 142 are two square apertures 145 for receiving connectors. On the bottom of the left guide track 138 on the side which will face away from the roll-up door is a notch 144, which will be used to lock the roll-up door in the lowered position. A right guide track 146 (FIG. 27) which is the mirror image of the left guide track 138 will also be used to mount the roll-up door.

Referring next to FIG. 16, a head stop 148 which will be used to limit the upward movement of the roll-up door is shown. The head stop 148 is J-shaped, with the J being mounted upside-down. Two square apertures 150 are located in the head stop 148, which correspond to the apertures 145 in the left guide track 138. Carriage bolts (not shown) will be used to mount the head stop 148 to the left guide track 138 to limit the upper movement of the roll-up door.

Referring next to FIG. 17, a plastic glide 152 which will be installed on the edge 142 on the left guide track 138 (and on a similar edge on the right guide track 146) is illustrated. The plastic glide 152 is designed to guide the roll-up door from a position above and in front of the edge 142 of the left guide track 138 into the left guide track 138. In the preferred embodiment, the plastic glide 152 is made of a hard, slippery plastic material, which will fit in an interference fit on the edge 142 of the left guide track 138.

Referring now to FIG. 18, a reversible mounting clip 154 is shown which is L-shaped. Near the top of the L are two apertures 156 and a slot 158, and in the bottom of the reversible mounting clip 154 is a single aperture 160. The length of the reversible mounting clip 154 is sufficient to fit through a pair of the slots 140 in the left guide track 138 (FIG. 14) with a goodly amount protruding, as best shown in FIGS. 19 and 20.

FIG. 19 shows the reversible mounting clip 154 installed in the left guide track 138 in a manner extending away from the opening the roll-up door is to be installed in. Such a mounting arrangement is used where the left guide track 138 is to be mounted onto a building having cinder-block construction, for example, where holes cannot be drilled too close to the opening. A hole is drilled through the aperture 160 into the left guide track 138, and a self-threading bolt 162 is screwed in through the aperture 160 and the drilled hole to retain the reversible mounting clip 154 on the left guide track 138. Bolts or other hardware (not shown) are used in the apertures 156 and/or the slot 158 to secure the reversible mounting clip 154 and the left guide track 138 on the inner wall of the building (not shown) near the opening in which the roll-up door is to be installed.

FIG. 20 illustrates the reversible mounting clip 154 installed in the left guide track 138 in a manner extending toward the opening the roll-up door is to be installed in. This mounting arrangement may be used if the opening in which the roll-up door of the present invention is to be installed into has a metal or wood frame.

FIG. 19 also shows the installation of plastic door slides 164 and 166 on each of the two longitudinal edges (FIG. 14) of the left guide track 138, with the plastic door slides 164 and 166 functioning to guide the roll-up door when it is raised or lowered. The plastic door slides 164 and 166 have a basically U-shaped cross-sectional configuration to surround the longitudinal edges of the left guide track 138. The plastic door slide 164 fits on the longitudinal edge of the left guide track 138 facing the outside of the opening in which the roll-up door is installed, and the plastic door slide 166 fits on the longitudinal edge of the left guide track 138 facing the inside.

The plastic door slide 164 has a retaining edge 168 which snaps over the folded outer edge of the left guide track 138 to retain the plastic door slide 164 in place. In a similar fashion, the plastic door slide 166 has a retaining edge 170 which snaps over the folded inner edge of the left guide track 138 to retain the plastic door slide 166 in place. The plastic door slides 164 and 166 are both molded of low-friction plastic material.

The construction of the plastic door slide 164 differs from the construction of the plastic door slide 166 in that the plastic door slide 164 has an inwardly extending molded plastic flexible finger 172 attached thereto adjacent the retaining edge 168. The flexible finger 172 extends toward the interior of the left guide track 138, and curves in a direction toward the interior of the building in which the roll-up door is installed at the unattached end thereof. The flexible finger 172 will serve to help seal the roll-up door when it is in its lowered position, to prevent air from passing through the door around the side edges thereof.

As mentioned above, the left guide track 138 is installed on the left side of the opening immediately inside the edge of the opening, and the right guide track 146 (FIG. 27) is installed on the right side of the opening immediately inside the edge of the opening. The right guide track 146 may use the identical plastic door slides 164 and 166, but will have them installed in an inverted position to form mirror images of the plastic door slides 164 and 166 on the left guide track 138.

FIG. 20 illustrates a different arrangement in which a plastic door slide 174 is installed on the folded outer edge of the left guide track 138. The longitudinal edges of the left guide track 138 are not folded flat, but rather at an approximately thirty degree angle. Thus, while the plastic door slide 174 is U-shaped to fit over the outer longitudinal edge of the left guide track 138, it has a retaining curve 176 to retain the plastic door slide 174 in place on the outer edge. The plastic door slide 174 also has an inwardly extending molded plastic flexible finger 178 attached thereto adjacent the retaining curve 176. The inner longitudinal edge does not use a plastic door slide in the embodiment shown in FIG. 20.

Referring next to FIG. 21, the mechanism which will be used to raise and lower the roll-up door is illustrated together with the left door support bracket 100, to which it is attached. (The mechanism could alternatively be attached to the right door support bracket 102 in similar fashion to that described below.) A chain guide bracket 180 which is a rectangular segment of metal having ends bent outward at ninety degree angles is used to support the majority of the mechanism.

Two apertures 182 and 184 located in the chain guide bracket 180 near one end thereof are used to mount the chain guide bracket 180 on the left door support bracket 100. Two spacers 186 and 188 are used to support the chain guide bracket 180 away from the left door support bracket 100, with two bolts 190 and 192 used to attach the chain guide bracket 180 to the left door support bracket 100. (Thus the chain guide bracket 180 will be supported in front of the left pivot arm 122.) The bolt 190 extends through the aperture 182 in the chain guide bracket 180, the spacer 186, and the aperture 110 in the support plate 108 of the left door support bracket 100. Similarly, the bolt 192 extends through the aperture 184 in the chain guide bracket 180, the spacer 188, and the aperture 111 in the support plate 108 of the left door support bracket 100.

An aperture 194 is centrally located in the chain guide bracket 180. A chain wheel 196 mounted on a shaft 198 has the shaft 198 extending through the aperture 194 in the chain guide bracket 180, supported by a bearing (not shown). A flat washer 200 is welded onto the shaft 198 on the side of the chain guide bracket 1 opposite the chain wheel 196. A sprocket 202 is mounted on the end of the shaft 198 opposite the chain wheel 196, with a key 204 being used to key the sprocket 202 to the shaft 198.

Referring now to FIGS. 3 and 10 in addition to FIG. 21, a sprocket 206 is mounted onto the drum 44 of the barrel assembly 94 on the left end thereof. Three spacers 208 are used to space apart the sprocket 206 and the surface of the drum 44. Three bolts 210 extend through three apertures 212 in the sprocket 206, the three spacers 208, and the apertures 48 in the drum 44. A chain 214 is connected to allow the sprocket 202 to drive the sprocket 206.

Finally, a hand chain 216 is used to drive the chain wheel 196. The hand chain 216 is maintained in place on the chain wheel 196 by the angled ends of the chain guide bracket 180. A chain clip 218 may be mounted to the interior wall adjacent the left guide track 138. The chain clip 218 is used to retain the hand chain 216 therein to prevent the roll-up door from accidentally coming down once it is raised.

Referring next to FIG. 22, a reinforcing beam 220 is used at the bottom of the roll-up door (not shown) to reinforce the bottom edge thereof. The reinforcing beam 220 shown herein is a molded segment, typically made of aluminum. The reinforcing beam 220 is preferably fastened to the bottom of the roll-up door by using a double re-entrant joint formed by inserting a bent portion on the bottom of the roll-up door (not shown) into a cooperating bent portion 222 on the top of the reinforcing beam 220. A sealing strip 224 is retained in the bottom of the reinforcing beam 220 to provide a water resistant seal between the bottom of the roll-up door and the floor or ground.

Referring now to FIG. 23, a segment of angle iron 226 is shown mounted onto the interior side of the reinforcing beam 220. Two bolts 228 extend through apertures 230 in the reinforcing beam 220 and apertures 232 in the segment of angle iron 226 near the left end thereof. A lock spacer 234 is placed on each of the bolts 228 as they protrude through the segment of angle iron 226, as shown. A slide lock 236 has two slots 238 therein which are slightly larger than the outside diameter of the lock spacers 234. The lock spacers are also slightly thicker than the slide lock 236 is. The slide lock 236 fits in place with the two spacers 234 fitting in the two slots 238 of the slide lock 236.

An angle segment 240 has two apertures 242 therein, through which the two bolts 228 pass. Two nuts 244 fit on the ends of the two bolts 228. Thus it will be appreciated that the slide lock 236 is mounted in a manner allowing it to slide back and forth. The end of the slide lock 236 will fit into the notch 144 in the bottom of the left guide track 138 (FIG. 14) when the roll-up door is down and the slide lock 236 is slid to the left.

Welded onto the angle segment 240 is a head stop bar 246, which extends to the left of the angle segment 240. The head stop bar 246 is designed to cooperate with the head stop 148 (FIG. 16) which is mounted just below the edge 142 of the left guide track 138 (FIG. 14). As such, the head stop bar 246 limits the upper movement of the bottom edge of the roll-up door.

The roll-up door which is used in the present invention is a formed metal curtain door 250, which is shown in full in FIG. 27. The formed metal curtain door 250 is of corrugated construction, with a cross-section as shown in FIG. 25. One key aspect of the roll-up door of the present invention is the use of a plurality of bearing blocks 252 mounted on the side edges of the formed metal curtain door 250 on the outside thereof. One such bearing block 252 is shown in FIG. 24. The bearing block 252 is preferably made of a tough, low-friction plastic material.

The central portion of the bearing block 252 is designed to fit on a corrugation peak (as shown in FIG. 25), and the top and bottom ends of the bearing block 252 are designed to fit in the corrugation valleys on each side of the corrugation peak on which the central portion is located (as shown in FIG. 25). The bearing block 252 is sufficiently wide to fit the entire portion of the formed metal curtain door 250 received in the interior of the left guide track 138 or the right guide track 146.

The central portion of the bearing block 252 thus has a flat surface 254 configured to fit the corrugation peak. Centrally located on the flat surface 254 of the bearing block 252 is a mounting post 256 having two detent tabs 258 and 260 thereon. The mounting post 256 will fit into one of a series of apertures located in each corrugation peak of the formed metal curtain door 250 near the left and right side edges thereof. As mounting post 256 is inserted into such an aperture, the detent tabs 258 and 260 are compressed toward the mounting post 256 until they pass through the aperture in the formed metal curtain door 250. As the detent tabs 258 and 260 pass through the aperture in the formed metal curtain door 250, they spread outwardly again, retaining the mounting post 256 in the aperture and the bearing block 252 in position on the edge on the formed metal curtain door 250.

Located on one side of the flat surface 254 on the bearing block 252 are three ribs 262 which conform to one side of a valley on one side of a peak of the corrugation in the formed metal curtain door 250. On the sides of the ribs 262 not attached to the flat surface 254 is a wall 264, which extends from side to side of the bearing block 252. Two tabs 266 and 268 extend from the sides of the wall 264 on the side away from the ribs 262. The tabs 266 and 268 may be seen as an extension of the outer two ribs 262. The tabs 266 and 268 together with the wall 264 form a U-shaped segment, the interior of which may be seen as a notch.

Located on the other side of the flat surface 254 on the bearing block 252 are three ribs 270 which conform to one side of a valley on the other side of the peak of the corrugation in the formed metal curtain door 250. A U-shaped wall 272 is attached to the sides of the ribs 270 not attached to the flat surface 254 of the bearing block 252. The tops of the legs of the U-shaped wall 272 are attached to the insides of the two outer ribs 270, with the base of the U-shaped wall 272 being attached to the center rib 270. The exterior of the U-shaped wall 272 may be seen as a tongue which is sufficiently narrow to fit into the notch formed by the tabs 266 and 268 and the wall 264.

Figure 26:
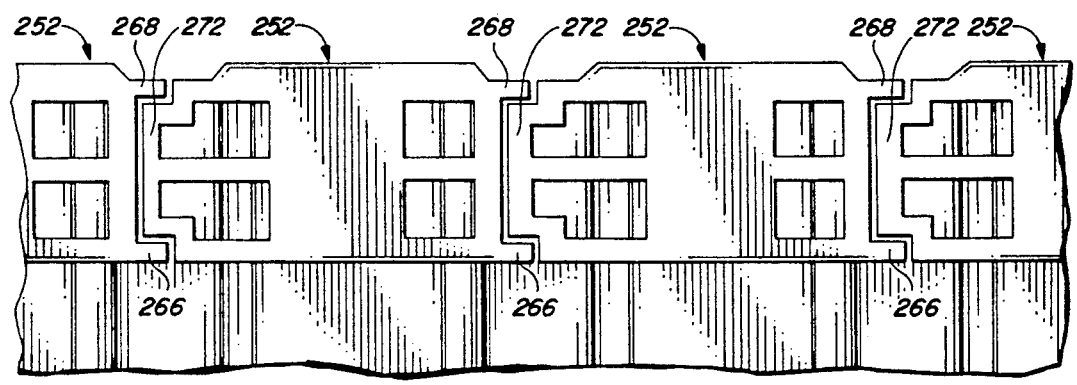
FIG. 26 is a view from the outside of a portion of the formed metal curtain door showing a number of the bearing blocks of FIG. 24 mounted thereon.

One such bearing block 252 thus constructed is mounted onto each peak in the corrugation of the formed metal curtain door 250 on each side thereof. FIGS. 25 and 26 illustrate the installation of several of the bearing blocks 252 onto the outside of the formed metal curtain door 250 on one side edge thereof. FIG. 25 is drawn looking at the blocks 252 in the direction of the arrows in FIG. 24, whereas FIG. 26 is a view from the back or outside of the roll-up door, looking in the direction of the arrows in FIG. 25. It may be seen, particularly in FIG. 26, that the tongue formed by the U-shaped wall 272 of each bearing block 252 fits into the notch formed by the tabs 266 and 268 and the wall 264 of the next adjacent bearing block 252. The bearing blocks 252 will allow the formed metal curtain door 250 to be rolled up, since they are not connected together. The bearing block 252 may also have an edge wall 273, which covers the edge of the formed metal curtain door 250.

The bearing blocks 252 perform two functions. The first function is a supporting function in which the bearing blocks 252 support successive layers of the formed metal curtain door 250 as it is rolled up. The second function is a sealing function, in which the bearing blocks 252 interlock with each other to provide an interlocking fit when the formed metal curtain door 250 is in its lowered position, presenting an essentially flat continuous surface facing the exterior. The flexible finger 172 mounted with the plastic door slide 164 on the outer longitudinal edge of the left guide track 138 (FIG. 19) and a similar flexible finger 172 on the right guide track 146 fit against the continuous groups of bearing blocks 252 on each side of the formed metal curtain door 250. Air is thus essentially prevented from flowing through or past the edges of the roll-up door of the present invention.

Referring now to FIG. 27, the completed assembly of the roll-up door of the present invention is illustrated, with the mechanism for raising and lowering the formed metal curtain door 250 removed for clarity. The left guide track 138 is mounted on the left side of the opening using the reversible mounting clips 154. Similarly, the right guide track 146 is mounted on the right side of the opening using the reversible mounting clips 154.

The left door support bracket 100 is mounted on the left side and near the top of the left guide track 138. Similarly, the right door support bracket 102 is mounted on the right side and near the top of the right guide track 146. The barrel assembly 94 is supported from the left pivot arm 122 on the left side thereof, and from the right pivot arm 128 on the right side thereof. As shown best in FIG. 28, the axle 96 is clamped to the left pivot arm 122 using a clamp consisting of two facing saddle clamps 84 (FIG. 9) with the axle 96 clamped between them, and two bolts through the two saddle clamps 84 and the two slots 123 is the left pivot arm 122. The right side of the axle 96 is clamped to the right pivot arm 128 in similar fashion.

The top of the formed metal curtain door 250 is attached to the four drums 44 with drum wedges 280 between the top of the formed metal curtain door 250 and the outer diameter of the drums 44, as best shown in FIG. 28. The drum wedges adapt the drums 44 to the first corrugation in the formed metal curtain door 250. The drum wedges 280 may be welded to the drums. The formed metal curtain door 250 is typically bolted to the drums 44.

Referring again to FIG. 28, two retaining studs 282 and 284 are mounted in the slots 130 and 132, respectively. The restraining stud 282 limits the travel of the left pivot arm 122 in a counter-clockwise direction, and the restraining stud 284 limits the travel of the left pivot arm 122 in a clockwise direction. Thus, the restraining stud 282 limits the travel of the barrel assembly 94 at the top of the left pivot arm 122 and the right pivot arm 128 (not shown) toward the outside of the building. Likewise, the restraining stud 284 limits the travel of the barrel assembly 94 at the top of the left pivot arm 122 and the right pivot arm 128 (not shown) toward the inside of the building. Similar retaining studs 282 and 284 are used in the slots 134 and 136, respectively, of the right door support bracket 102, restricting similarly the movement of the right pivot arm 128.

When the formed metal curtain door 250 is in its fully downward position as in FIG. 28, the left pivot arm 122 will be in its fully counter-clockwise direction. (The right pivot arm 128 is also in a similar position.) The barrel assembly 94 is then closest to the point directly above the top of the left guide track 138 and the right guide track 146 (not shown). In this position, the fall of the formed metal curtain door 250 off of the barrel assembly 94 is directly downward into the interior of the left guide track 138 and the right guide track 146 (not shown).

As the formed metal curtain door 250 is rolled up on the barrel assembly 94, the outer diameter will increase. As this occurs, the left pivot arm 122 will move clockwise, carrying together with the right pivot arm 128 the barrel assembly 94 away from the wall on which the roll-up door is mounted. The result of this movement of the barrel assembly 94 on the left pivot arm 122 and the right pivot arm 128 is that the fall of the formed metal curtain door 250 off of the barrel assembly 94 will always be directly downward into the interior of the left guide track 138 and the right guide track 146 (not shown).

When the formed metal curtain door 250 is fully rolled up as shown in FIG. 29, the left pivot arm 122 will be in its fully clockwise position, restrained from further movement by the restraining stud 284. (The right pivot arm 128 is also in a similar position.) With the diameter of the formed metal curtain door 250 on the barrel assembly 94 at its maximum, it may be seen that the fall of the formed metal curtain door 250 off of the barrel assembly 94 into the interior of the left guide track 138 and the right guide track 146 (not shown) is still vertical. Thus, it will be appreciated that the entry of the formed metal curtain door 250 into the left guide track 138 and the right guide track 146, as well as its exit therefrom, will be smooth and not subject to binding or excessive friction and wear.

Figure 30:
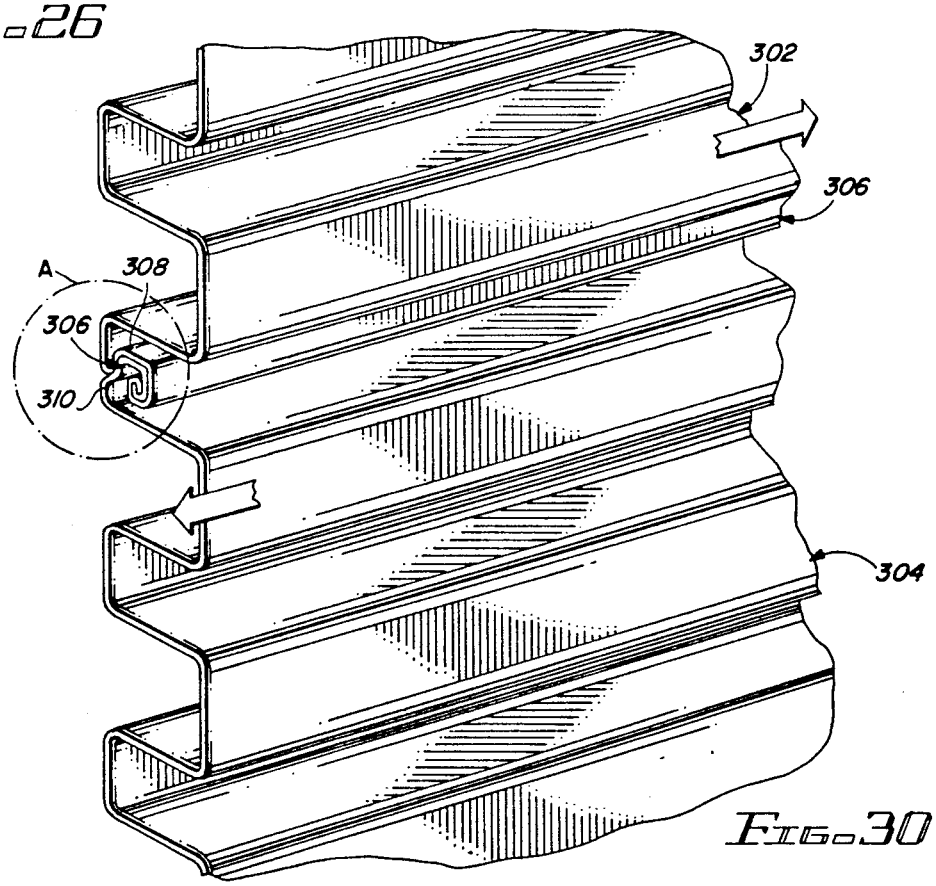
FIG. 30 is a partial view of a roll-up door showing one particular arrangement in accordance with the invention for joining adjacent corrugated panels.

FIGS. 30–33 illustrate a further aspect of the present invention which presents an improved seam or juncture of adjacent panels which are joined together to make up the corrugated roll-up door. As indicated in FIG. 30, a pair of corrugated panels 302, 304 are joined together by a special seam configuration 306 in accordance with the present invention. This seam configuration 306 is constructed for easy assembly and disassembly, so that a damaged panel may be removed and replaced in situ.

Figure 31:
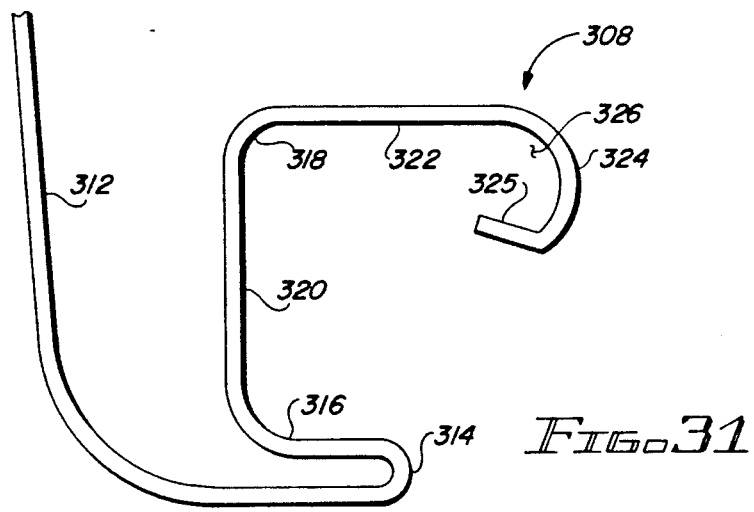
FIG. 31 is an enlarged view of the edge of the upper panel shown within the circle A of FIG. 30.
Figure 32:
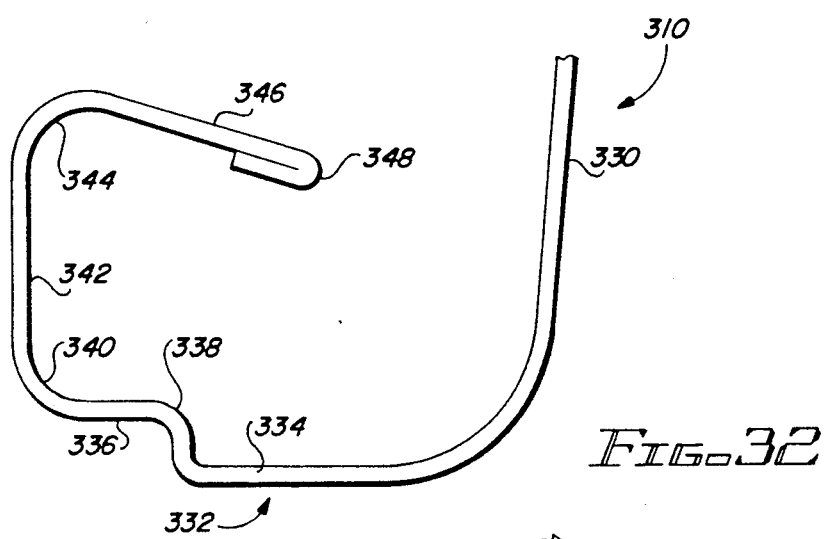
FIG. 32 is a view of the edge of the lower panel within the circle A of FIG. 30.

The panels 302, 304 are formed with mating edge configurations 308 and 310, respectively shown in the enlarged end views of FIGS. 31 and 32. The edge 308 is shown in FIG. 31 as extending from a standard corrugation 312 to a U-shaped portion 314. The panel then continues through a pair of generally right-angled corners 316, 318 to respective orthogonal sections 320, 322. The edge 308 terminates in another generally U-shaped portion 324 and a terminal lip 325, forming a pocket 326. The terminal lip 325 is fixed at a predetermined angle which produces a slight closing of the U-shaped pocket 326.

The mating edge 310 is shown in FIG. 32 as extending from a corrugation 330 to an extended wall 332 having offset portions 334, 336 joined by curved dogleg section 338. The panel continues from the portion 336 through a right-angle curve 340 to a straight section 342, then through an acute angle 344 to a straight section 346 terminating in a nose portion 348. The acute angle 344 is such that the segment 346 is generally parallel to the angled terminal portion 325 of FIG. 31 when the two edges 308 and 310 are joined to form the seam 306, as best shown in FIG. 33.

When two edges 308, 310 of adjacent panels 302, 304 are joined in the seam 306 as indicated in FIG. 30, they can be very readily slid apart sideways, as indicated by the oppositely-directed arrows in FIG. 30. Conversely, the roll-up door can be assembled by sliding panels together edgeways. This is only possible, however, if there is sufficient room to the sides of a roll-up door, which is not always the case in the field. To assemble or disassemble an individual panel in this manner, at least double the width of the door is required as space to accommodate the panels as they are slid sideways relative to each other.

Figure 33:
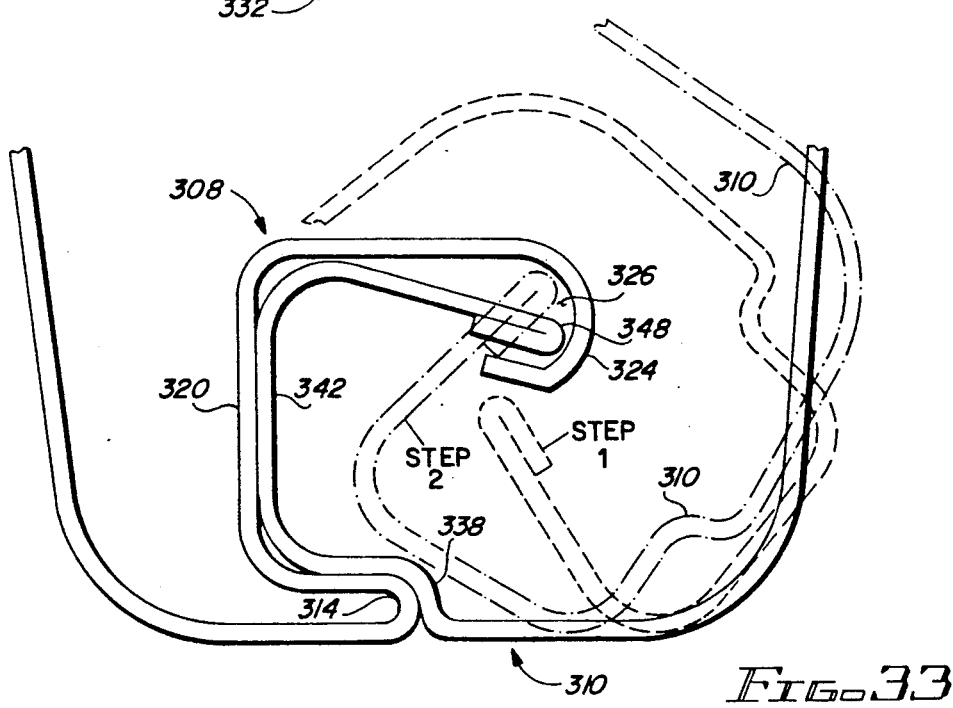
FIG. 33 is a schematic view illustrating one way in which the two panels of FIG. 30 may be joined.

FIG. 33 illustrates the way in which two panels can be assembled when there is essentially no spare room on either side of the roll-up door. The broken-outline representations in FIG. 33 show how the edge 310 is positioned initially (step 1) relative to the edge 308 and then rotated through step 2 to the final position as depicted in solid outline joined within the edge 308. Disassembly of the seam 306 may be accomplished just as readily by rotating the edge 310 in reverse order to that described for assembly.

When the two edges 308 and 310 are joined in the seam 306 as particularly shown in FIG. 33, it will be noted that the straight portion 342 of edge 310 is in contact with the straight portion 320 of edge 308 while the nose portion 348 of the edge 310 is in contact with the U-shaped portion 324 of edge 308, within the pocket 326 thereof. The dogleg portion 338 of edge 310 is in firm engagement with the mating portion of the U-shaped segment 314 of edge 308. Thus a strong, tight and secure seam 306 is established by the joining of the two shaped edges 308, 310 having the mating configurations as shown and described herein. The resulting roll-up door formed of a plurality of panels having these edge configurations can flex readily in the roll-up direction (upward in FIG. 30) but has limited flexibility in the opposite direction because of the respective configurations of the edges 306, 308, particularly because of the lip 325 which engages the end 348 of the segment 346 and precludes rotation in the opposite direction about the pivot edge at the dogleg 338 bearing against the U-shaped bend 314. This preserves the security and integrity of the roll-up door constructed in accordance with the teaching of the present invention.

This seam design allows the panels to be assembled and disassembled, yet has the beneficial feature of enabling the panels to flex in the rolled-up direction, the same as if they were lock-seamed together as is the construction of the prior art.

The following method is disclosed to be practiced when a damaged panel is to be removed and replaced in situ:

(a) Remove the headstops and roll the door up all the way.

(b) Pivot the swinging brackets away from the wall and then bring the door down close to the floor (outside of the edge guides).

(c) Place a table, a set of sawhorses or some other support, such as a truck bed, under the door.

(d) Using the chain operator, cause the door to descend further and make the door curtains hinge at the seam in the desired directions, causing the panel seams to disengage at the desired point, as illustrated in FIG. 33.

(e) Remove the damaged panel from both edge seams and replace it with a new panel, following the above steps in reverse order.

It may therefore be appreciated from the above detailed description of the preferred embodiment of the present invention that it teaches in a first primary aspect a roll-up door having a substantially stronger barrel assembly design than previously known roll-up doors. The improved design is substantially less susceptible to flexural stress than are such presently known doors. In addition, the improved barrel assembly design is designed in a manner which increases the strength thereof without greatly increasing the weight of the barrel assembly.

In a second primary aspect of the present invention, the barrel assembly is mounted in a manner whereby the variation in diameter of the barrel assembly does not affect the performance of the door. In achieving this objective, the barrel assembly is mounted no further from the interior surface of the wall than is absolutely necessary.

In a third primary aspect of the present invention, the springs used in the barrel assembly are mounted in a manner allowing for considerable longitudinal expansion and shrinkage. By so doing, the likelihood that catastrophic breakage of the spring will occur is greatly reduced. In a correlated aspect, the barrel assembly is designed to be serviceable by the user in the event of spring breakage, thus obviating the need to send the barrel assembly to the factory for repair is a spring breaks.

In a fourth primary aspect of the present invention, a mechanism is provided for supporting the formed metal curtain door as it is rolled onto the barrel assembly. This mechanism protects the formed metal curtain door against damage caused by nesting of the corrugations and the weight of the formed metal curtain door.

In an additional aspect, a sealing mechanism is provided to prevent air from flowing around the edges of the door when it is in its lowered position. In a further additional aspect, the clips which support the guide tracks are reversible. The roll-up door of the present invention is as durable and long-lasting as is possible, while being economic of construction to afford it the greatest possible economic advantage over competing doors.

Finally, a novel seam configuration is provided for roll-up doors used in arrangements of the present invention wherein the edges of the panels are formed with mating configurations which enable the panels to be assembled or disassembled by either sliding sideways relative to each other (if there is sufficient room to permit this) or by rotating one panel relative to the plane of the other panel to either engage or disengage the mating edges which form the panel seam.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A roll-up door system for mounting across a door opening, comprising:
    a pair of guide tracks for vertical installation as door guide members on both sides of the door opening;
    a hexagonal tube member, said hexagonal tube member being hollow;
    a plurality of drums mounted on said hexagonal tube member, one of said drums being mounted at each end of said hexagonal tube member, each of said drums having means defining a generally hexagonal central opening for receiving the hexagonal tube member therein;
    an axle extending through the interior of said hexagonal tube member,
    at least one torsion spring mounted about said axle within said hexagonal tube member and secured at one end thereof to said axle;
    torque means coupled between said torsion spring and said tube member, said torque means being slidable longitudinally of said axle and said tube member to accommodate changes in dimension of said torsion spring during rotation of the tube member;
    bearing means for mounting said hexagonal tube member for rotational movement on said axle;
    means for supporting said axle in a horizontal position adjacent the upper edge of the door opening; and
    a roll-up door mounted at the top thereof to and supported by said plurality of drums, said roll-up door being positionable to cover the door opening with the side edges of said roll-up door being retained by said guide tracks, said roll-up door being rolled about said plurality of drums as said roll-up door is raised;
    wherein said torque means include a corresponding spring plate located inside said hexagonal tube member, said torsion spring being secured at the other end thereof to said spring plate, said torque means balancing the weight of said roll-up door to allow it to be easily raised or lowered, said spring plate being free to move longitudinally within said hexagonal tube member while being constrained to rotate with said hexagonal tube member about said axle; and
    wherein said spring plate is U-shaped, with the base of the U being flat and rectangular, the outside dimensions of said base being selected to match the inside dimensions of two opposed walls of said hexagonal tube member such that said spring plate is able to slide longitudinally within said hexagonal tube member but is constrained against angular rotation relative to said hexagonal tube member.

2. A door system as defined in claim 1, wherein each of said guide tracks has a plurality of pairs of opposed slots formed therein, said slots being adapted for receiving a mounting clip extending therethrough one of said guide tracks.

3. A door system as defined in claim 2, wherein said mounting clip comprises:
    an L-shaped mounting clip having a longer leg and a shorter leg, the longer leg of said mounting clip fitting through one of said pairs of opposed slots in one of said guide tracks, the shorter leg of said mounting clip having an aperture therein and fitting against the side of said one of said guide tracks, a screw being inserted through said aperture in said shorter leg of said mounting clip into an aperture in said one of said guide tracks.

4. A door system as defined in claim 1, wherein said guide tracks define channels to retain the side edges of said roll-up door, each of said guide tracks having two longitudinal folded edges, one of said longitudinal folded edges being on each side of said roll-up door when said roll-up door is installed in place, additionally comprising:
    a plastic door slide mounted on each of said folded longitudinal edges of each of said guide tracks to guide said roll-up door when it is raised or lowered, said plastic door slides having a U-shaped cross sectional configuration and a retaining edge which snaps over the longitudinal folded edges of said guide track to retain said plastic door slides in place.

5. A door system as defined in claim 1, wherein the top edge of said guide tracks is lower on the side facing the interior of the door opening than on the side facing the exterior of the door opening, additionally comprising:

a plastic glide installed on the top edge of each of said guide tracks on the side facing the interior of the door opening, said plastic glide being designed to guide said door into said guide tracks.

6. A door system as defined in claim 1, additionally comprising:

first door stop means for inhibiting further upward movement of said roll-up door, said first door stop means being mounted on one of said guide tracks near the top thereof; and second door stop means for inhibiting further upward movement of said roll-up door, said second door stop means being mounted on said roll-up door near the bottom thereof.

7. A door system as defined in claim 1, wherein said supporting means is pivotable to vary the distance of the axle from the door opening in accordance with the extent to which the door is rolled about said drums.

8. A door system as defined in claim 1, wherein said hexagonal tube member comprises:

a first tube half having three elongate rectangular surfaces, with the longer sides of said three rectangular surfaces of said first tube half being connected together at adjacent edges, the angles between adjacent surfaces of said first tube half being 120 degrees; and a second tube half having three elongate rectangular surfaces, with the longer sides of said three rectangular surfaces of said second tube half being connected together at adjacent edges, the angles between adjacent surfaces of said second tube half being 120 degrees, said first and second tube halves being secured together to form said hexagonal tube member.

9. A roll-up door system for mounting across a door opening, comprising:

a pair of guide tracks for vertical installation as door guide members on both sides of the door opening;

a hexagonal tube member, said hexagonal tube member being hollow;

a plurality of drums mounted on said hexagonal tube member, one of said drums being mounted at each end of said hexagonal tube member, each of said drums having means defining a generally hexagonal central opening for receiving the hexagonal tube member therein;

an axle extending through the interior of said hexagonal tube member;

at least one torsion spring mounted about said axle within said hexagonal tube member and secured at one end thereof to said axle;

torque means coupled between said torsion spring and said tube member, said torque means being slidable longitudinally of said axle and said tube member to accommodate changes in dimension of said torsion spring during rotation of the tube member;

bearing means for mounting said hexagonal tube member for rotational movement on said axle;

means for supporting said axle in a horizontal position adjacent the upper edge of the door opening; and a roll-up door mounted at the top thereof to and supported by said plurality of drums, said roll-up door being positionable to cover the door opening with the side edges of said roll-up door being retained by said guide tracks, said roll-up door being rolled about said plurality of drums as said roll-up door is raised;

wherein said hexagonal tube member comprises:

(a) a first tube half having three long, rectangular surfaces, with the longer sides of said three surfaces of said first tube half being connected together at the edges, the angles between adjacent sides of said first tube half being 120 degrees; and (b) a second tube half having three long, rectangular surfaces, with the longer sides of said three surfaces of said second tube half being connected together at the edges, the angles between adjacent sides of said second tube half being 120 degrees, said first and second tube halves being secured together to form said hexagonal tube member;

wherein one long free edge of each of said first and second tube halves has a flange extending therefrom, and the other long free edge of each of said first and second tube halves has a U-shaped segment extending therefrom, each U-shaped segment having a shorter free leg and a longer leg attached to said long free edge of one of said first and second tube halves, said flange being oriented directly away from said U-shaped segment, and the interior of said U-shaped segment being oriented toward said flange, said flange of said first tube half being disposed in said U-shaped segment of the second tube half, and said flange of said second tube half disposed in said U-shaped segment of said first drum half.

10. A door system as defined in claim 9, additionally comprising:

a pair of U-shaped clips each having a lip disposed on the inside of one of the legs of the U at the top thereof, said U-shaped clips being slipped over said U-shaped segments of said first and second tube halves with said lips over the shorter legs of said U-shaped segments, said U-shaped clips being locked in place hold the first and second tube halves together.

11. A door system as defined in claim 1, wherein said drums each comprise:

a cylindrical segment larger in diameter than said hexagonal tube member;

a disk of the same diameter as said cylindrical segment, said disk being joined to said cylindrical segment at one end of said cylindrical segment, said disk having a hexagonal aperture therein to admit said hexagonal tube member.

12. A door system as defined in claim 11, wherein said roll-up door is made of corrugated material, additionally comprising:

a drum wedge for attachment to said cylindrical segment in each of said drums, said drum wedge continuously increasing the diameter of said cylindrical segment to an amount larger than the diameter of said cylindrical segment by the thickness of the corrugation of said corrugated material.

13. A door system as defined in claim 1, wherein said bearing means comprises:

a bearing plate mounted at each end of said hexagonal tube member to a corresponding drum mounted at the same end of said hexagonal tube member, said bearing plate having a bearing member therein for supporting said axle for rotation.

14. A door system as defined in claim 13, additionally comprising:

clamp means mounted on said axle on the two segments of said axle outside said hexagonal tube member and adjacent said bearing plates at each end of said hexagonal tube member.

15. A door system as defined in claim 1, additionally comprising:

a slide member mounted for lateral motion on the bottom of said roll-up door and at one side thereof; and a notch in the one of said guide tracks adjacent said slide member at the bottom thereof, said slide member being moveable laterally into engagement with said notch in said guide track to lock said roll-up door in its lowered position.

16. A roll-up door system for mounting across a door opening, comprising:

a pair of guide tracks for vertical installation as door guide members on both sides of the door opening;

a hexagonal tube member, said hexagonal tube member being hollow;

a plurality of drums mounted on said hexagonal tube member, one of said drums being mounted at each end of said hexagonal tube member, each of said drums having means defining a generally hexagonal central opening for receiving the hexagonal tube member therein;

an axle extending through the interior of said hexagonal tube member;

at least one torsion spring mounted about said axle within said hexagonal tube member and secured at one end thereof to said axle;

torque means coupled between said torsion spring and said tube member, said torque means being slidable longitudinally of said axle and said tube member to accommodate changes in dimension of said torsion spring during rotation of the tube member;

bearing means for mounting said hexagonal tube member for rotational movement on said axle;

means for supporting said axle in a horizontal position adjacent the upper edge of the door opening; and a roll-up door mounted at the top thereof to and supported by said plurality of drums, said roll-up door being positionable to cover the door opening with the side edges of said roll-up door being retained by said guide tracks, said roll-up door being rolled about said plurality of drums as said roll-up door is raised;

wherein said supporting means is pivotable to vary the distance of the axle from the door opening in accordance with the extent to which the door is rolled about said drums;

wherein said supporting means comprises a pair of door support brackets for installation adjacent the top of said guide tracks, each of said door support brackets supporting a pivot arm extending upwardly, each said pivot arm being rotatably moveable with respect to the door support bracket supporting it toward and away from said the plane of the door opening, said axle being supported at the ends thereof by said pivot arms;

and additionally comprising means for limiting the movement of said pivot arms toward and away from the plane of the door opening, including a first restraining stud mounted on each of said door support brackets for limiting the movement of said pivot arms mounted on said support brackets in a direction toward the plane of the door opening, and a second restraining stud mounted on each of said door support brackets for limiting the movement of said pivot arms mounted on said support brackets in a direction away from the plane of the door opening;

wherein said first and second restraining studs are mounted in slots to allow for adjustment in the degree of movement said restraining studs allow said pivot arms to have.

17. A door system as defined in claim 16, wherein each of said door support brackets comprise:

a segment of angle iron to be mounted to a wall member adjacent to one of said guide tracks;

a support plate attached to said segment of angle iron, said support plate extending away from the exterior of the door opening; and a pivot tube orthogonally mounted on said support plate, one of said pivot arms being mounted on said pivot tube.

18. A door system as defined in claim 1, additionally comprising:

a cylindrical segment mounted on said spring plate base and defining a central aperture in said spring plate through which said axle extends.

19. A door system as defined in claim 1, wherein said torsion spring is secured at one end with a clamp, said clamp comprising:

a saddle clamp having an aperture in the side thereof for retaining one end of said torsion spring therein; and a U-shaped bolt segment fitting around said axle and securing said saddle clamp in place on said axle.

20. A door system as defined in claim 1, wherein said torque means include:

a plurality of torsion springs mounted about said axle and inside said hexagonal tube member, each torsion spring being secured at one end thereof to said axle; and a corresponding plurality of spring plates located inside said hexagonal tube member, each torsion spring being secured at the other end thereof to a corresponding spring plate, each spring plate being free to move longitudinally within said hexagonal tube member while being constrained to rotate with said hexagonal tube member about said axle.

21. A door system as defined in claim 7, wherein said supporting means comprises:

a pair of door support brackets for installation adjacent the top of said guide tracks, each of said door support brackets supporting a pivot arm extending upwardly, each said pivot arm being rotatably moveable with respect to the door support bracket supporting it toward and away from said the plane of the door opening, said axle being supported at the ends thereof by said pivot arms.

22. A door system as defined in claim 21, additionally comprising:

means for limiting the movement of said pivot arms toward and away from the plane of the door opening.

23. A door system as defined in claim 22, wherein said limiting means comprises:
  a first restraining stud mounted on each of said door support brackets for limiting the movement of said pivot arms mounted on said support brackets in a direction toward the plane of the door opening; and
  a second restraining stud mounted on each of said door support brackets for limiting the movement of said pivot arms mounted on said support brackets in a direction away from the plane of the door opening.

24. A roll-up door system for mounting across a door opening, comprising:
  a pair of guide tracks for vertical installation as door guide members on both sides of the door opening;
  a hexagonal tube member, said hexagonal tube member being hollow;
  a plurality of drums mounted on said hexagonal tube member, one of said drums being mounted at each end of said hexagonal tube member, each of said drums having means defining a generally hexagonal central opening for receiving the hexagonal tube member therein;
  an axle extending through the interior of said hexagonal tube member;
  bearing means for mounting said hexagonal tube member for rotational movement on said axle;
  means for supporting said axle in a horizontal position adjacent the upper edge of the door opening; and
  a roll-up door mounted at the top thereof to and supported by said plurality of drums, said roll-sup door being positionable to cover the door opening with the side edges of said roll-up door being retained by said guide tracks, said roll-up door being rolled about said plurality of drums as said roll-up door is raised;
  wherein said roll-up door is of corrugated construction having peaks and valleys facing outwardly, said roll-up door having a plurality of apertures therein, which apertures are located in said peaks adjacent each side edge of said roll-up door, said door system additionally comprising:
  a plurality of bearing blocks, each bearing block having a rectangular configuration fitting over one of said peaks and into half of each adjacent valley, one end of said bearing block having a centrally located tongue extending therefrom, the other end of said bearing block having a centrally located notch therein, said tongue from said bearing block fitting into the notch on the next adjacent bearing block.

25. A door system as defined in claim 24, additionally comprising:
  a mounting post for extending through the aperture in said one of said peaks near a side edge thereof, said mounting post being centrally located on said flat surface; and
  means for retaining said mounting post in said aperture in said one of said peaks.

26. A door system as defined in claim 25, wherein said retaining means comprises:
  a plurality of detent tabs on said mounting post, said detent tabs being sloped to allow them to fit through said aperture in said one of said peaks, said detent tabs then retaining said mounting post in said aperture in said one of said peaks.

27. A door system as defined in claim 24, wherein said guide tracks define channels to retain the side edges of said roll-up door, each of said guide tracks having two longitudinal folded edges, one of said longitudinal folded edges being on each side of said roll-up door when said roll-up door is installed in place, said door system additionally comprising:
  a plastic door slide mounted on the outer of said folded longitudinal edges of each of said guide tracks, said plastic door slides having a U-shaped cross sectional configuration and a retaining edge which snaps over the longitudinal folded edges of said guide track to retain said plastic door slides; and
  a flexible finger extending from each of said plastic door slides, said flexible finger cooperating with said bearing blocks to block the passage of air past the sides of said roll-up door.

28. A roll-up door for use in the door system of claim 1, the door comprising:
  a plurality of panels joined edge to edge to form the roll-up door, each panel having particularly-shaped edge configurations such that the mating edges of a pair of adjacent panels join together in a releasable seam combination, one of said edges being releasably retained within the other of said edges in a joint which permits flexing in one direction but prevents flexing in the opposite direction.

29. The door of claim 28 wherein the edge configurations are such that one panel is slidable sideways relative to the other panel to permit disassembly of the two panels which are joined at a seam.

30. The door of claim 28 wherein the edge configurations are such that one edge may be rotated in one direction into engagement with the other edge to join two panels or rotated in the opposite direction out of engagement with the other edge to disassemble two panels from the door.

31. A roll-up door for use in a roll-up door system for mounting across a door opening, which system comprises:
  a pair of guide tracks for vertical installation as door guide members on both sides of the door opening;
  a hexagonal tube member, said hexagonal tube member being hollow;
  a plurality of drums mounted on said hexagonal tube member, one of said drums being mounted at each end of said hexagonal tube member, each of said drums having means defining a generally hexagonal central opening for receiving the hexagonal tube member therein;
  an axle extending through the interior of said hexagonal tube member;
  bearing means for mounting said hexagonal tube member for rotational movement on said axle;
  means for supporting said axle in a horizontal position adjacent the upper edge of the door opening; and
  a roll-up door mounted at the top thereof to and supported by said plurality of drums, said roll-up door being positionable to cover the door opening with the side edges of said roll-up door being retained by said guide tracks, said roll-up door being rolled about said plurality of drums as said roll-up door is raised;
  said roll-up door comprising:
  a plurality of panels joined edge to edge to form the roll-up door, each panel having particularly-shaped edge configurations such that the mating edges of a pair of adjacent panels join together in a releasable seam combination, one of said edges being releasably retained within the other of said edges in a joint which permits flexing in one direction but prevents flexing in the opposite direction; wherein a first edge of a panel has a terminal configuration comprising a first generally U-shaped portion continuing in succession to a first corner, a first straight segment, a second corner, a second straight segment and a second generally U-shaped portion with a terminal lip, the second generally U-shaped portion and the terminal lip forming a pocket.

32. The door of claim 31 wherein the terminal lip is fixed at a predetermined angle which produces a slight closing of the pocket.

33. The door of claim 31 wherein a second edge of said panel has a terminal configuration which mates with the terminal configuration of the first edge.

34. The door of claim 32 wherein the second edge terminal configuration comprises a pair of straight portions joined by a curved dogleg section and continuing through a first corner, a first straight segment, a second corner and a second straight segment terminating in an edge.

35. The door of claim 34 wherein the first and second corners of said first edge are essentially right angles, wherein the first corner of the second edge is a right angle and the second corner of the second edge is an acute angle, said acute angle being such that the second straight portion of the second edge is oriented generally parallel to the terminal lip of the first edge when the first and second edges are joined together in an interlocking seam with the terminal edge of the second edge configuration being positioned within the pocket of the first terminal configuration.

36. The door of claim 35 wherein the relative dimensions of the respective portions of two mating edges are such that, when said edges are joined together in interlocking relationship, the first straight portion of the second edge is in contact with the first straight portion of the first edge, the dogleg portion and one of the offset segments of the second edge are in engagement with adjacent segments of the first U-shaped portion of the first edge, and the terminal portion of the second edge is in contact with the inner surface of the pocket of the first edge.

37. A roll-up door system for mounting across a door opening, comprising:
a pair of guide tracks for vertical installation as door guide members on both sides of the door opening;
a first tube half having three long, rectangular surfaces, with the longer sides of said three surfaces of said first tube half being connected together at the edges, the angles between adjacent sides of said first tube half being 120 degrees; and
a second tube half having three long, rectangular surfaces, with the longer sides of said three surfaces of said second tube half being connected together at the edges, the angles between adjacent sides of said second tube half being 120 degrees, wherein one long free edge of each of said first and second tube halves has a flange extending therefrom, and the other long free edge of each of said first and second tube halves has a U-shaped segment extending therefrom, each U-shaped segment having a shorter free leg and a longer leg attached to said long free edge of one of said first and second tube halves, said flange being oriented directly away from said U-shaped segment, and the interior of said U-shaped segment being oriented toward said flange, said first and second tube halves being brought together to form a hexagonal tube member, said flange of said first tube half being disposed in said U-shaped segment of the second tube half, and said flange of said second tube half disposed in said U-shaped segment of said first tube half;
a plurality of drums mounted on said hexagonal tube member, each drum comprising a cylindrical segment larger in diameter than said hexagonal tube member and a disk of the same diameter as said cylindrical segment, said disk being attached to said cylindrical segment at one end of said cylindrical segment, said disk having a central hexagonal aperture therein to admit said hexagonal tube member, one of said drums being mounted at each end of said hexagonal tube member;
an axle extending through the interior of said hexagonal tube member;
a bearing plate mounted at each end of said hexagonal tube member to the ones of said drums mounted at the ends of said hexagonal tube member, said bearing plate having a bearing member therein for supporting said axle for rotation;
means for supporting said axle in a horizontal position adjacent the upper edge of the door opening; and a roll-up door mounted at the top thereof to, and supported by, said plurality of drums, said roll-up door being positionable to cover the door opening with the side edges of said roll-up door being retained by said guide tracks, said roll-up door being rolled about said plurality of drums as said roll-up door is raised.

* * * * *